US012783174B2

(12) United States Patent
Yu et al.

(10) Patent No.: US 12,783,174 B2
(45) Date of Patent: Nov. 3, 2026

(54) DATA WRITING CONTROL METHOD AND STORAGE DEVICE

(71) Applicant: Hefei Kaimeng Technology Co., Ltd., Anhui (CN)

(72) Inventors: Hao Yue Yu, Anhui (CN); Tsung-Lin Wu, Anhui (CN); Qiao Zhu, Anhui (CN); Yin Ping Gao, Anhui (CN)

(73) Assignee: Hefei Kaimeng Technology Co., Ltd., Anhui (CN)

(*) Notice: Subject to any disclaimer, the term of this patent is extended or adjusted under 35 U.S.C. 154(b) by 3 days.

(21) Appl. No.: 19/030,377

(22) Filed: Jan. 17, 2025

(65) Prior Publication Data

US 2025/0383813 A1 Dec. 18, 2025

(30) Foreign Application Priority Data

Jun. 14, 2024 (CN) ......................... 202410764356.6

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
USPC .......................................................... 711/154
See application file for complete search history.

(56) References Cited

U.S. PATENT DOCUMENTS

2010/0169603 A1* 7/2010 Perry .................... G06F 3/0659
711/E12.004
2019/0065097 A1* 2/2019 Liu ........................ G06F 3/0659
2022/0027048 A1* 1/2022 Blount .................. G06F 3/0659
2023/0017946 A1* 1/2023 Wei ...................... G06F 12/0246

* cited by examiner

*Primary Examiner* — Gautam Sain
(74) *Attorney, Agent, or Firm* — JCIPRNET

(57) ABSTRACT

Disclosed are a data writing control method and a storage device. This method includes: obtaining parameter information and execution information of a data merging process, wherein the data merging process includes at least one round, the parameter information includes the estimated completion time of the data merging process and the estimated number of executions of rounds, the execution information includes the quantity of valid data transferred and time consumed for each execution of a round; calculating the data transfer rate and the recycle time ratio reflecting the current round according to the parameter information and execution information; calculating the actual delay value reflecting the current round according to the data transfer rate, recycle time ratio and reference delay value; controlling the data writing speed corresponding to the host system according to the actual delay value.

14 Claims, 3 Drawing Sheets

DATA WRITING CONTROL METHOD AND STORAGE DEVICE

CROSS-REFERENCE TO RELATED APPLICATION

This application claims the priority benefit of China application serial no. 202410764356.6, filed on Jun. 14, 2024. The entirety of the above-mentioned patent application is hereby incorporated by reference herein and made a part of this specification.

BACKGROUND

Technical Field

The present disclosure relates to a memory management technology, particularly to a data writing control method and a storage device, configured to control the writing speed of a host system.

Description of Related Art

The non-volatile memory module (e.g., flash memory module) possesses advantages such as non-volatile data retention, low power consumption, and rapid data access. Generally, the non-volatile memory module is configured by default with a number of spare physical units to receive and store data from the host system. However, the number of spare physical units gradually decreases as data is written.

In order to prevent the depletion of available spare physical units, a common solution is to perform data merging operations in the background during data writing processes, thereby releasing new available spare physical units for subsequent use. However, this approach may give rise to the following issue: in the event that the rate of release of available spare physical units fails to keep pace with the data writing speed of the host system, it may result in the forced cessation of data writing operations by the host system.

Therefore, to solve the above problem, there is an urgent need for a data writing control method.

SUMMARY

The present disclosure provides a data writing control method and a storage device, which may calculate the actual delay value of the current execution round in real time during the execution of the merging process, and dynamically adjust the data writing bandwidth between the host system and the storage device according to the actual delay value, thereby improving the data writing speed.

An embodiment of the present disclosure provides a data writing control method, configured for a storage device, wherein the storage device includes a memory module. This data writing control method includes: obtaining parameter information and execution information of a data merging process, wherein the data merging process includes at least one round, the parameter information includes the estimated completion time of the data merging process and the estimated number of executions of rounds, and the execution information includes the quantity of valid data transferred and time consumed for each execution of a round; calculating the data transfer rate and recycle time ratio reflecting the current round according to the parameter information and execution information; calculating the actual delay value reflecting the current round according to the data transfer rate, recycle time ratio, and reference delay value; controlling the data writing speed corresponding to the host system according to the actual delay value.

From another perspective, an embodiment of the present disclosure provides a storage device, including a connection interface unit, a memory module, and a memory controller. The connection interface unit is configured to connect to the host system. The memory controller is connected to the connection interface unit and the memory module, configured to execute multiple steps: obtaining parameter information and execution information of a data merging process, wherein the data merging process includes at least one round, the parameter information includes the estimated completion time of the data merging process and the estimated number of executions of rounds, and the execution information includes the quantity of valid data transferred and time consumed for each execution of a round; calculating the data transfer rate and recycle time ratio reflecting the current round according to the parameter information and execution information; calculating the actual delay value reflecting the current round according to the data transfer rate, recycle time ratio, and reference delay value; controlling the data writing speed corresponding to the host system according to the actual delay value.

DESCRIPTION OF THE EMBODIMENTS

Figure 1:
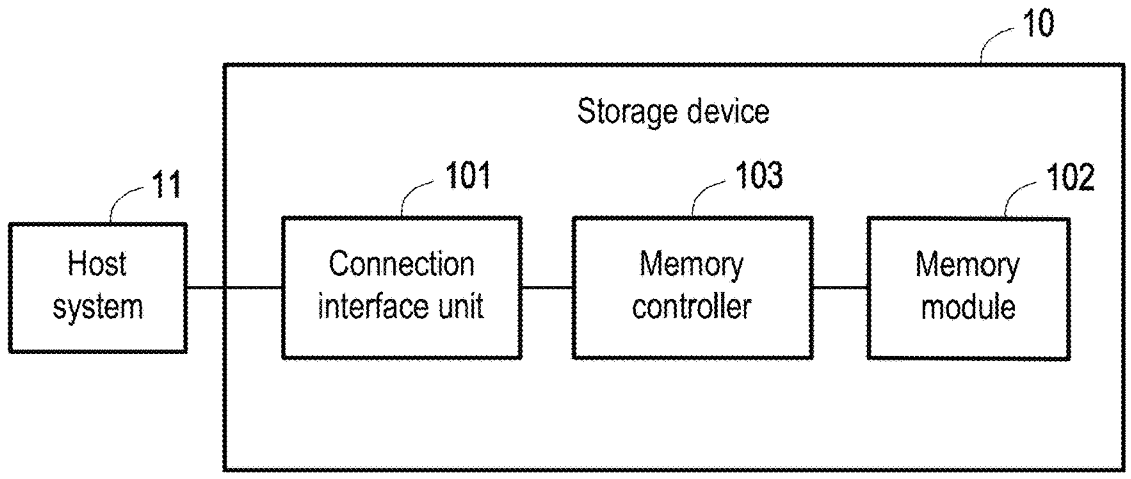
FIG. 1 is a schematic view of a memory storage device according to an embodiment of the present disclosure.

Now, exemplary embodiments of the present disclosure will be referred to in detail, with examples of the exemplary embodiments illustrated in the accompanying drawings. Wherever possible, the same reference symbols in the drawings and description are used to denote the same or similar parts.

FIG. 1 is a schematic view of a memory storage device according to an embodiment of the present disclosure. Referring to FIG. 1, a data storage system includes a storage device 10 and a host system 11. The host system 11 may be any type of computer system, such as a smartphone, a tablet computer, a notebook computer, a desktop computer, an industrial computer, a game console, a server, or in-vehicle computer, and the type of the host system 11 is not limited to these examples.

The storage device 10 is connected to the host system 11 and is configured to store data from the host system 11. For example, the storage device 10 may include a solid-state drive, a USB flash drive, a memory card, or other types of non-volatile storage devices. The host system 11 may communicate with the storage device 10 through embedded Multi-Media Card (eMMC), Universal Flash Storage (UFS), Peripheral Component Interconnect Express (PCI Express), Non-Volatile Memory Express (NVM Express), Serial Advanced Technology Attachment (SATA), Universal Serial Bus (USB), or other types of connection interface standards. Therefore, the host system 11 may store data to the storage device 10 and/or read data from the storage device 10.

The storage device 10 includes a connection interface unit 101, a memory module 102, and a memory controller 103.

The connection interface unit 101 is configured to connect the storage device 10 to the host system 11. For example, the connection interface unit 101 may support connection interface standards such as eMMC, UFS, PCI Express, NVM Express, SATA, PCI Express, or USB. The storage device 10 may communicate (e.g., exchange signals and/or data) with the host system 11 through the connection interface unit 101.

The memory module 102 is configured to store data. The memory module 102 may include one or more rewritable non-volatile memory modules. Each rewritable non-volatile memory module may include one or more storage unit arrays. The storage units in the storage unit array store data in the form of voltage. For example, the memory module 102 may include Single Level Cell (SLC) NAND flash memory modules, Multi Level Cell (MLC) NAND flash memory modules, Triple Level Cell (TLC) NAND flash memory modules, Quad Level Cell (QLC) NAND flash memory modules, and/or other memory modules with the same or similar characteristics.

The memory controller 103 is connected to the connection interface unit 101 and the memory module 102. The memory controller 103 may be considered as the control core of the storage device 10 and is configured to control the storage device 10. For example, the memory controller 103 may be responsible for controlling and/or managing all or part of the operations of the storage device 10. For instance, the memory controller 103 may include a Central Processing Unit (CPU), or other programmable general-purpose or special-purpose microprocessors, Digital Signal Processors (DSP), programmable controllers, Application Specific Integrated Circuits (ASIC), Programmable Logic Devices (PLD), or other similar devices or combinations of these devices. In an embodiment, the memory controller 103 includes a flash memory controller.

In an embodiment, the memory controller 103 may further include a buffer memory, a power management circuit, an encoding circuit, a decoding circuit, and/or other types of various circuit modules, which are not limited in the present disclosure. The buffer memory is configured to cache data. The power management circuit is configured to manage the power supply of the storage device 10. The encoding circuit is configured to encode the data to be stored in the memory module 102 to generate error correction code (and/or error checking code). The decoding circuit is configured to decode the data read from the memory module 102 to correct possible errors in the read data. For example, the encoding circuit and/or decoding circuit may use various encoding/decoding algorithms such as Low Density Parity Check code (LDPC code), BCH code, Reed-Solomon code (RS code), Exclusive OR (XOR) code, etc. to encode and decode data.

The memory module 102 may receive an instruction sequence from the memory controller 103 and access the storage units according to this instruction sequence. For example, when data is to be stored, the memory controller 103 may send a write instruction sequence to the memory module 102 to instruct the memory module 102 to store the data in specific storage units. When data is to be read, the memory controller 103 may send a read instruction sequence to the memory module 102 to instruct the memory module 102 to read data from specific storage units. When data is to be deleted, the memory controller 103 may send an erase instruction sequence to the memory module 102 to instruct the memory module 102 to erase the data stored in specific storage units. In addition, the memory controller 103 may further send other types of instruction sequences to the memory module 102 to instruct the memory module 102 to execute corresponding operations, which is not limited in the present disclosure.

Figure 2:
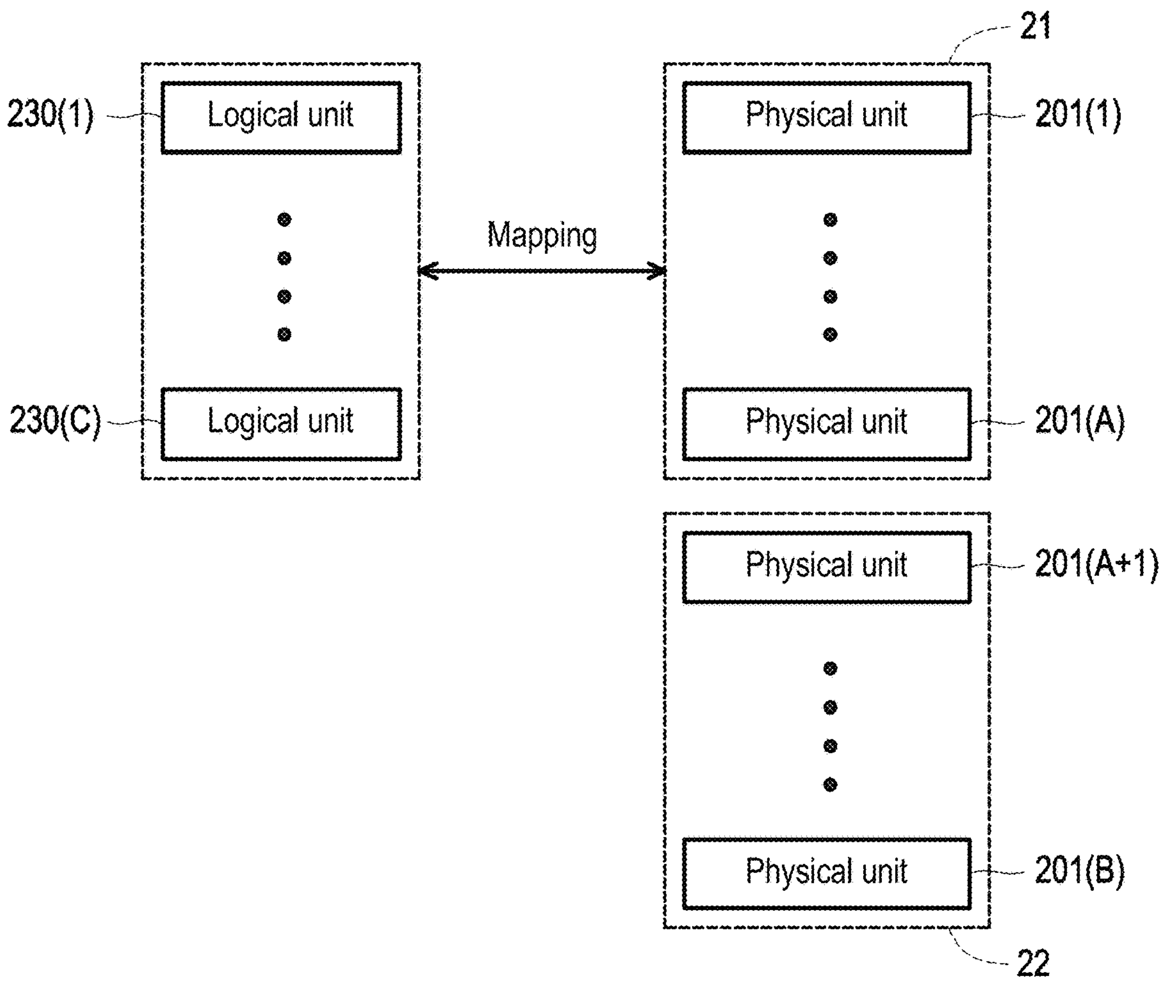
FIG. 2 is a schematic view of managing a memory module according to an embodiment of the present disclosure.

FIG. 2 is a schematic view of managing a memory module according to an embodiment of the present disclosure. Referring to FIG. 1 and FIG. 2, the memory module 102 includes multiple physical units 201(1) to 201(B). Each physical unit includes multiple storage units and is configured for non-volatile storage of data.

In an embodiment, a physical unit may include multiple physical sectors. For example, the data capacity of a physical sector may be 512 bytes (B), and one physical unit may include 8 physical sectors. However, the data capacity of a physical sector and/or the total number of the physical sectors contained in one physical unit may be adjusted according to practical requirements, which is not limited by the present disclosure.

In an embodiment, a physical unit may be regarded as a physical page. For example, the data capacity of one physical page may be 4 kilobytes (4 KB), and the present disclosure is not limited thereto. In an embodiment, a physical unit may be regarded as a physical block.

In an embodiment, a physical page is the minimum unit for synchronous data writing in the memory module 102. For example, when performing a programming operation on a physical page to write data to this physical page, multiple storage units in this physical page may be programmed synchronously to store corresponding data. For example, when programming a physical page, a write voltage may be applied to this physical page to change the threshold voltage of at least some storage units in this physical page. The threshold voltage of each storage unit may reflect the bit data stored in this storage unit.

In an embodiment, the memory module 102 may include multiple physical blocks. Each physical block may include multiple physical units. Specifically, multiple physical units (e.g., physical pages) in the same physical block may be erased synchronously. For example, when erasing a physical block, an erase voltage may be applied to multiple physical pages in this physical block to change the threshold voltage of at least some storage units in these physical pages and clear the bit data stored in each storage unit of these physical pages.

In an embodiment, the memory controller 103 may logically associate physical units 201(1) to 201(A) with the data area 21 and associate physical units 201(A+1) to 201(B) with the spare area 22. The physical units 201(1) to 201(A) in the data area 21 are configured to store data (also called user data) from the host system 11. For example, each physical unit in the data area 21 may store valid data and/or invalid data. In addition, the physical units 201(A+1) to 201(B) in the spare area 22 do not store data.

In an embodiment, if a physical unit does not store valid data, this physical unit may be associated with the spare area 22. In an embodiment, the spare area 22 is also called a free pool. Furthermore, the physical units associated with the spare area 22 may be erased to clear the data in these physical units.

In an embodiment, when there is data (i.e., user data) from the host system 11 that needs to be stored, the memory controller 103 may select one or more physical units from the spare area 22 and instruct the memory module 102 to store the data from the host system 11 into the selected physical units. Meanwhile, the selected physical units may be associated with the data area 21.

In an embodiment, the memory controller 103 may configure multiple logical units 230(1) to 230(C) to map the physical units 201(1) to 201(A) in the data area 21. For example, one logical unit may correspond to one logical block address (LBA) or other logical management unit. One logical unit may be mapped to one or more physical units in the data area 21.

In an embodiment, if a physical unit is currently mapped by any logical unit, the memory controller 103 may determine that the data currently stored in this physical unit includes valid data. Conversely, if a physical unit is not currently mapped by any logical unit, the memory controller 103 may determine that this physical unit currently does not store any valid data (and/or all data in this physical unit is invalid data).

In an embodiment, the memory controller 103 may record the mapping relationship between logical units and physical units in a logical-to-physical mapping table. When receiving an access instruction (e.g., read instruction, write instruction, delete instruction, or other types of instructions) from the host system 11, the memory controller 103 may instruct the memory module 102 to execute corresponding operations according to the information in this logical-to-physical mapping table.

The memory controller 103 may execute a data merging process as needed, which is also called a garbage collection process. For example, the memory controller 103 may determine the quantity of physical units in the spare area 22, and if this quantity is too low, such as less than a threshold, the data merging process may be performed. However, this disclosure does not limit when to execute the data merging process. When executing the data merging process, the memory controller 103 may select at least one physical unit from the data area 21 as the source physical unit and select at least one physical unit from the spare area 22 as the target physical unit. The memory controller 103 may copy the valid data stored in the source physical unit collectively to the target physical unit.

The data merging process may include one or more rounds, with each round selecting a source physical unit. In each round, the valid data stored in the source physical unit is transferred to the target physical unit. After a round ends, if the target physical unit is not fully written, meaning there is still spare space, the next round will proceed, selecting another source physical unit and repeating the valid data transfer operation.

Figure 3:
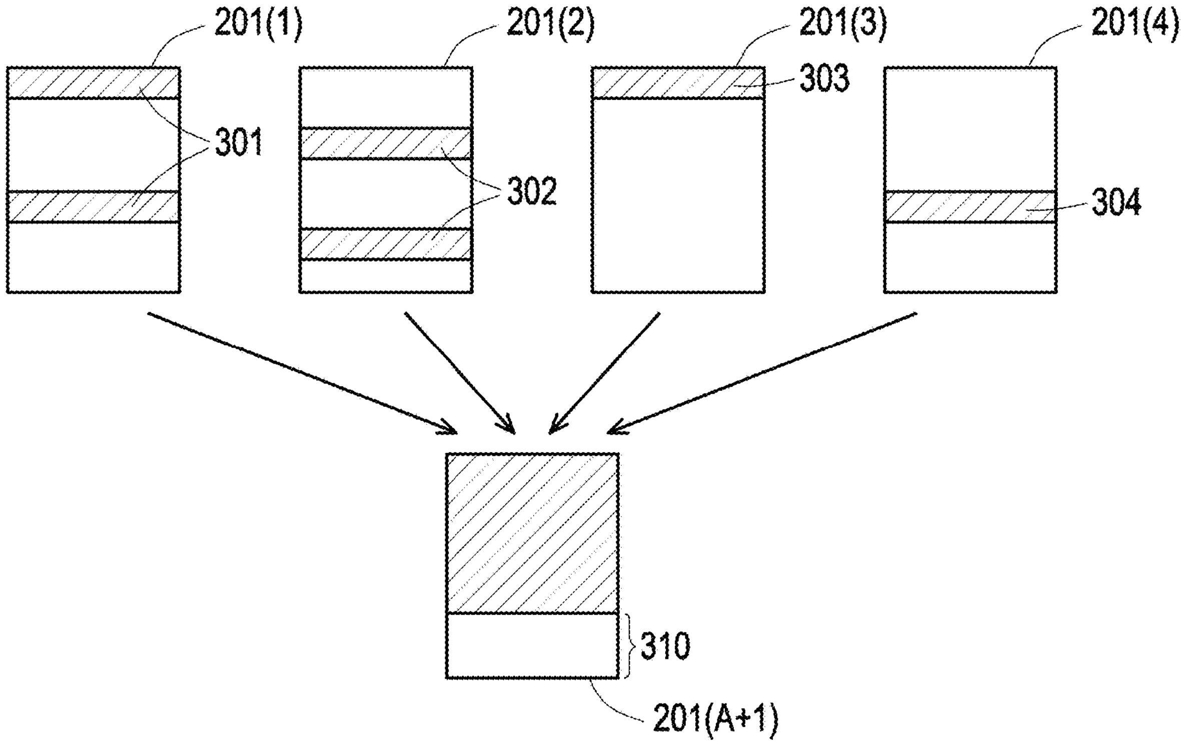
FIG. 3 is a schematic view illustrating a data merging process according to an embodiment.

Specifically, please refer to FIG. 3, which is a schematic view illustrating the data merging process according to an embodiment. As shown in FIG. 3, in this example, there are 4 rounds in total. The first round selects the physical unit 201(1) as the source physical unit, the second round selects the physical unit 201(2) as the source physical unit, the third round selects the physical unit 201(3) as the source physical unit, and the fourth round selects the physical unit 201(4) as the source physical unit. These source physical units 201(1) to 201(4) are different from each other. All four rounds use the physical unit 201(A+1) as the target physical unit. The physical unit 201(1) stores valid data 301, which is transferred to the target physical unit 201(A+1) in the first round. In this example, after the first round ends, there is still spare space in the target physical unit 201(A+1), so the second round proceeds to transfer the valid data 302 stored in the source physical unit 201(2) to the target physical unit 201(A+1). Similarly, in the third and fourth rounds, valid data 303 and 304 are transferred to the target physical unit 201(A+1) respectively.

After the valid data stored in the source physical unit is copied to the target physical unit 201(A+1), all data in the source physical unit will be marked as invalid and the source physical unit may be allocated to the spare area 22. Furthermore, the physical unit allocated to the spare area 22 may be erased to clear the data stored in this physical unit.

In an embodiment, the operation of reallocating a physical unit from the data area 21 to the spare area 22 is also referred to as releasing a physical unit. In other words, during the initiation of the data merging process, one or more physical units may be gradually released, causing the total number of physical units belonging to the spare area 22 to gradually increase. For example, after the first round, the source physical unit 201(1) will be released; after the second round, the source physical unit 201(2) will be released, and so on.

In an embodiment, after initiating the data merging process, this data merging process may be executed in the background. Meanwhile, the host system 11 may continue to store data to the storage device 10 in the foreground.

In an embodiment, when the data merging process is initiated, the memory controller 103 may actively reduce the data writing bandwidth between the storage device 10 and the host system 11, where this data writing bandwidth may reflect the data writing speed between the storage device 10 and the host system 11.

In this way, it is possible to avoid further depletion of the already scarce physical units in the spare area 22 by actively reducing the data writing speed of the host system 11, thereby enhancing the stability of the data writing bandwidth (or data writing speed) between the storage device 10 and the host system 11.

In an embodiment, the data writing bandwidth may be adjusted by adjusting the quantity, frequency, or time interval of extracting write instructions from the host system 11.

For example, the memory controller 103 may reduce the total number of at least one write instruction extracted from the host system 11 through the Direct Memory Access (DMA) operation. In a state where the data merging process is not initiated, the memory controller 103 may extract k write instructions (k being any integer greater than 1) from the memory of the host system 11 through the DMA operation within 10 seconds. However, in a state where the data merging process is initiated, the memory controller 103 may extract p write instructions (p being a positive integer) from the memory of the host system 11 also within 10 seconds through the DMA operation, wherein p is less than k.

In an embodiment, when the data merging process is initiated, the memory controller 103 may set an actual delay value.

Exemplarily, the memory controller 103 may set this actual delay value to a value greater than zero. During the execution of the data merging process, the memory controller 103 may extract a write instruction (also referred to as the first write instruction) from the host system 11 through the DMA operation. Then, the memory controller 103 may start calculating a waiting time and determine whether this waiting time has reached this actual delay value. When the waiting time reaches this actual delay value, the memory controller 103 may extract the next write instruction (also referred to as the second write instruction) from the host system 11 through the DMA operation.

In this way, through the method provided in this embodiment, the characteristic property of waiting time between two consecutive write instructions may be determined based on the actual delay value. By adjusting the actual delay value, the data writing speed of the host system 11 may be adjusted, thereby achieving control over the data writing speed and improving the efficiency of data writing.

In this embodiment, the data moving speed of the data merging process is considered at the level of rounds, and the data writing speed corresponding to the host system 11 is adjusted according to the data moving speed.

Figure 4:
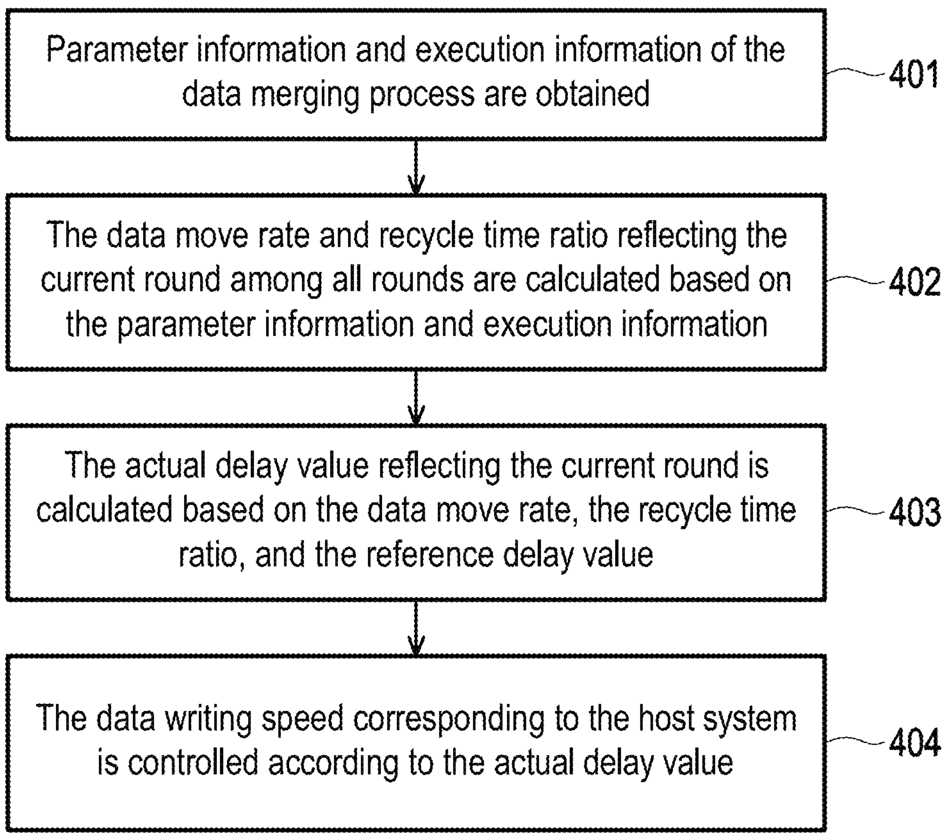
FIG. 4 is a flowchart illustrating a data writing control method according to an embodiment.

Specifically, please refer to FIG. 4. FIG. 4 is a flowchart illustrating a data writing control method according to an embodiment. As shown in FIG. 4, the data writing method in this embodiment of the present disclosure includes the following steps.

In step 401, parameter information and execution information of the data merging process are obtained.

Here, the parameter information includes information obtained from previous executions of the data merging process or information set by the system. For example, the parameter information includes the estimated completion time of the data merging process. This estimated completion time may be obtained through statistical analysis after collecting multiple data merging processes, or may be a default value of the system. The present disclosure is not limited in this regard.

Additionally, the parameter information may also include the estimated number of executions of the aforementioned rounds. For example, the system default is 5 times, or in an embodiment, it may also be possible to statistically determine how many rounds were executed during executions of previous data merging process, and obtain the estimated number of executions through statistical methods. The aforementioned statistical methods may include taking the maximum value, average value, median, etc. The present disclosure is not limited in this regard.

On the other hand, the aforementioned execution information may include relevant information of multiple rounds in the currently executing data merging process, such as the quantity of valid data transferred and time consumed in each round.

In step 402, the data transfer rate and recycle time ratio reflecting the current round among all rounds are calculated based on the parameter information and execution information.

Exemplarily, the data transfer rate of the current round is calculated based on the quantity of valid data transferred in the current round. Since this transfer quantity is an absolute value, the data transfer rate may be calculated in combination with other parameters. For example, a relative ratio may be obtained by dividing the quantity of valid data transferred in the current round by a transfer quantity statistically derived from previous executions of the data merging process. This ratio may reflect whether the current transfer quantity is relatively large or small.

In step 403, the actual delay value reflecting the current round is calculated based on the data transfer rate, the recycle time ratio, and the reference delay value.

For example, a value (also called the first value) reflecting the moving speed in the current round may be calculated based on the data transfer rate and recycle time ratio. When the moving speed is high, it indicates that new spare physical units may be released more quickly, and in this state, a small actual delay value may be set. Conversely, when the moving speed is low, it indicates that the release speed of new spare physical units is slow, and in this state, a large actual delay value may be set.

In step 404, the data writing speed corresponding to the host system 11 is controlled according to the actual delay value.

Exemplarily, when the actual delay value is large, the waiting time between two write instructions is longer, and the data writing speed of the host system 11 is slower. Conversely, when the actual delay value is small, the waiting time between two write instructions is shorter, and the data writing speed of the host system 11 is faster. The relationship between the actual delay value and data writing speed has been described in the above paragraphs and will not be repeated here.

In some cases, there is less valid data in the source physical unit, meaning the mapping of valid data is very random. This may result in the valid data from one source physical unit being unable to fill a target physical unit completely, leading to multiple rounds. According to existing practices, if the situation of multiple rounds is not considered, a slower data moving speed may be calculated, resulting in a larger actual delay value. This causes the data writing speed to decrease, and might even lead to problems such as write timeout.

Thus, through the method provided in this embodiment, an accurate actual delay value may be dynamically calculated for each round during the execution of the merging process. Furthermore, by adjusting the data writing bandwidth between the host system and the storage device based on the calculated actual delay value, the purpose of accelerating the speed at which the host system writes data during data merging process may be achieved.

In an embodiment, the maximum data transfer quantity among all rounds may be determined first. Then, the data transfer rate may be calculated based on the maximum data transfer quantity and the quantity of valid data transferred in the current round.

Exemplarily, the maximum data transfer quantity is determined based on the execution information of the data merging process. The maximum value of the quantity of valid data transferred in each round is taken as the maximum data transfer quantity according to the execution information.

Furthermore, by comparing the data transfer quantity of the current round with the maximum data transfer quantity, a ratio, which is the data transfer rate, may be obtained.

In an embodiment, the data transfer rate may be obtained by dividing the quantity of valid data already transferred in the current round by the maximum data transfer quantity, as shown in the following Mathematical Formula 1.

$$\text{Data transfer rate} = (\text{Quantity of valid data transferred in the current round} \times 100) / \text{Maximum data transfer quantity} \quad \text{[Mathematical Formula 1]}$$

To illustrate this with specific numbers, please refer to FIG. 3 and FIG. 4. Assume that the current round is the fourth round, and in the first three rounds, 40 units (for example, bytes) of valid data are transferred in each round, and each round takes 20 ms. In the fourth round, 20 units of valid data have been transferred, taking 10 ms. In this example, the quantity of valid data already transferred in the current round is 20, and the transfer quantities of valid data in these four rounds are 40, 40, 40, and 20 respectively. The maximum value among these four numbers is 40, which is the maximum data transfer quantity. By inputting the relevant numbers into Mathematical Formula 1, it may be obtained that the data transfer rate equals 20×100/40=50. In this embodiment, the right side of the equal sign in Mathematical Formula 1 is multiplied by 100 to calculate the percentage. In other embodiments, this value "100" may also be replaced by other non-zero values.

In other embodiments, the data transfer rate may also be obtained by dividing the quantity of valid data already transferred in the current round by the average data transfer quantity of all rounds. Alternatively, the data transfer rate may be obtained by inputting the quantity of valid data already transferred in the current round into a function, which may be a polynomial function, exponential function, etc. In an embodiment, the quantity of valid data already transferred in the current round may also be combined with other variables to calculate the data transfer rate. The present disclosure is not limited to the above-mentioned embodiments.

On the other hand, step 402 also calculates the recycle time ratio, which reflects the time consumed in the current round. Since the time consumed in the current round is an absolute value, the absolute value may be further compared with other values to calculate a ratio. For example, the time consumed in each round during previous executions of the data merging process may be statistically recorded, and then a reference value may be obtained based on statistical methods. By comparing the time consumed in the current round with this reference value, a more appropriate ratio may be obtained. The aforementioned statistical methods may include taking the maximum value, minimum value, average value, etc. The present disclosure is not limited to these methods.

In this way, through the method provided in this embodiment, compared to the common method of calculating the data transfer rate based on the estimated data transfer quantity as a reference value, the present disclosure chooses to use the maximum data transfer quantity in the execution rounds as the reference value to calculate the data transfer rate, referencing the actual execution progress. Such approach obtains a data transfer rate that more accurately reflects the execution of the data merging process of the current round, thereby improving the calculation accuracy of the actual delay value, which may be more precisely used in controlling the writing speed.

In an embodiment, a unit time consumption may be calculated based on the aforementioned estimated completion time and estimated number of executions. This unit time consumption refers to the estimated time consumed for executing one round, for example, by dividing the estimated completion time by the estimated number of executions to obtain the unit time consumption. Then, the recycle time ratio may be calculated based on the time consumed for transferring valid data in the current round and this unit time consumption. If the time consumed in the current round is large and the unit time consumption is small, it indicates that the current round consumes more time compared to previous rounds, so a larger recycle time ratio may be set. Conversely, if the time consumed in the current round is small and the unit time consumption is large, it indicates that the current round consumes less time compared to previous rounds, so a smaller recycle time ratio may be set. For example, the recycle time ratio may be obtained by dividing the time consumed for transferring valid data in the current round by the unit time consumption, as shown in the following Mathematical Formula 2.

$$\text{Recycle time ratio} = (\text{Time consumed in the current round} \times 100)/\text{Unit time consumption} \quad \text{[Mathematical Formula 2]}$$

In this example, the estimated completion time is 100 ms, and the estimated execution times is 5, so the unit time consumption is 100/5=20. Continuing with the above example, the current round is the fourth round, consuming 10 ms. By inputting these numbers into Mathematical Formula 2, the recycle time ratio may be calculated as 10×100/20=50. Similarly, in this embodiment, the right side of the equal sign in Mathematical Formula 2 is multiplied by 100 to calculate the percentage. In other embodiments, this value "100" may also be replaced by other non-zero values.

In other embodiments, the time consumed in the current round may also be input into a function or combined with other variables to calculate the data transfer time. The present disclosure is not limited to the aforementioned embodiment.

In this way, through the method provided in this embodiment, by calculating the transfer speed of the current round to determine the release speed of spare physical units, and further, by setting an actual delay value that matches the release speed, the purpose of dynamically controlling the data writing speed may be achieved.

In an embodiment, the actual delay value may be calculated based on the first value and the reference delay value. The first value may serve as an adjustment parameter. The reference delay value may be magnified or reduced based on the first value to calculate the actual delay value, wherein the first value is proportional to the actual delay value.

In an embodiment, the reference delay value is calculated based on the estimated completion time of the data merging process and the spare storage capacity of the target physical unit. When the estimated completion time is large, it means that more time is required to execute the data merging process each time, therefore a large reference delay value needs to be set. Conversely, a small reference delay value may be set.

Moreover, when the spare storage capacity of the target physical unit is larger, it means that more source physical units need to be selected to fill the target physical unit, and these source physical units have the opportunity to be released. At this time, the data writing speed of the host system 11 may be increased, and a small reference delay value may be set. Conversely, a large reference delay value may be set.

In an embodiment, the reference delay value may be obtained by dividing the estimated completion time of the data merging process by the spare storage capacity of the target physical unit.

Continuing with the above example, the estimated completion time is 100 ms. Please refer to FIG. 3, where it is assumed that the spare storage capacity 310 (i.e., the total amount of space that has not been written with valid data) of the target physical unit 201(A+1) is 500 units (for example, bytes). Therefore, in this example, the reference delay value is 100/500=0.2, as shown in the following Mathematical Formula 3.

$$\text{Reference delay value} = \text{Estimated completion time}/\text{Spare storage capacity of the target physical unit} \quad \text{[Mathematical Formula 3]}$$

As mentioned above, the first value may serve as an adjustment parameter. Based on the first value, the reference delay value may be magnified or reduced to calculate the actual delay value.

In an embodiment, the first value mentioned above (which is inversely proportional to the transfer rate of the current round) may be obtained by dividing the recycle time ratio by the data transfer rate. Subsequently, the actual delay value may be obtained by multiplying the reference delay value by the first value.

As shown in the following Mathematical Formula 4. By inputting the numbers from the above example into Mathematical Formula 4, the actual delay value may be obtained as 0.2×50/50=0.2.

$$\text{Actual delay value} = \text{Reference delay value} \times \text{Recycle time ratio}/\text{Data transfer rate} \qquad \text{[Mathematical Formula 4]}$$

In this way, through the method provided in this embodiment, by simultaneously considering the data transfer rate, recycle time ratio, and reference delay value as influencing factors, a more representative actual delay value for executing the data merging process in the current round may be calculated. Furthermore, based on this actual delay value, the speed of writing data in the next round of execution may be dynamically adjusted, resulting in higher flexibility and accuracy for data writing control.

Finally, it should be noted that: the above embodiments are only used to illustrate the technical solutions of the present disclosure, and are not intended to limit them; although the present disclosure has been described in detail with reference to the foregoing embodiments, those skilled in the art should understand that: they may still modify the technical solutions described in the foregoing embodiments, or make equivalent replacements to part or all of the technical features; and these modifications or replacements do not cause the essence of the corresponding technical solutions to deviate from the scope of the technical solutions in the embodiments of the present disclosure.

What is claimed is:

1. A data writing control method, configured for a storage device, wherein the storage device comprises a memory module, the data writing control method comprising:

obtaining parameter information and execution information of a data merging process, wherein the data merging process comprises at least one round, the parameter information comprises an estimated completion time of the data merging process and an estimated number of executions of rounds, and the execution information comprises a quantity of valid data transferred and a time consumed for each of the executions of the rounds;

calculating a data transfer rate and a recycle time ratio reflecting a current round among the rounds according to the parameter information and the execution information;

calculating an actual delay value reflecting the current round according to the data transfer rate, the recycle time ratio, and a reference delay value; and controlling a data writing speed corresponding to a host system according to the actual delay value, wherein the step of controlling the data writing speed corresponding to the host system according to the actual delay value comprises:

determining whether waiting time has reached the actual delay value after extracting a first write instruction from the host system; and extracting a second write instruction from the host system if the waiting time has reached the actual delay value.

2. The data writing control method according to claim 1, wherein the step of calculating the data transfer rate and the recycle time ratio reflecting the current round among the rounds according to the parameter information and the execution information comprises:

determining a maximum data transfer quantity among the rounds; and calculating the data transfer rate based on the maximum data transfer quantity and the quantity of the valid data transferred in the current round.

3. The data writing control method according to claim 2, wherein the step of calculating the data transfer rate based on the maximum data transfer quantity and the quantity of the valid data transferred in the current round comprises:

obtaining the data transfer rate by dividing the quantity of the valid data already transferred in the current round by the maximum data transfer quantity.

4. The data writing control method according to claim 1, wherein the step of calculating the data transfer rate and the recycle time ratio reflecting the current round among the rounds according to the parameter information and the execution information comprises:

calculating a unit time consumption based on the estimated completion time and the estimated number of executions; and calculating the recycle time ratio based on the time consumed for transferring the valid data in the current round and the unit time consumption.

5. The data writing control method according to claim 4, wherein the step of calculating the unit time consumption based on the estimated completion time and the estimated number of executions comprises:

obtaining the unit time consumption by dividing the estimated completion time by the estimated number of executions, wherein the step of calculating the recycle time ratio based on the time consumed for transferring the valid data in the current round and the unit time consumption comprises:

obtaining the recycle time ratio by dividing the time consumed for transferring the valid data in the current round by the unit time consumption.

6. The data writing control method according to claim 1, wherein the step of calculating the actual delay value reflecting the current round according to the data transfer rate, the recycle time ratio, and the reference delay value comprises:

calculating a first value reflecting a moving speed in the current round based on the data transfer rate and the recycle time ratio; and calculating the actual delay value based on the first value and the reference delay value.

7. The data writing control method according to claim 6, wherein the step of calculating the first value reflecting the moving speed in the current round based on the data transfer rate and the recycle time ratio comprises:

obtaining the first value by dividing the recycle time ratio by the data transfer rate, wherein the step of calculating the actual delay value based on the first value and the reference delay value comprises:

obtaining the actual delay value by multiplying the reference delay value by the first value.

8. A storage device, comprising:

a connection interface unit, configured to connect to a host system;

a memory module; and a memory controller, connected to the connection interface unit and the memory module, wherein the memory controller is configured to execute a plurality of steps:

obtaining parameter information and execution information of a data merging process, wherein the data merging process comprises at least one round, the parameter information comprises an estimated completion time of the data merging process and an estimated number of executions of rounds, and the execution information comprises a quantity of valid data transferred and a time consumed for each of the executions of the rounds;

calculating a data transfer rate and a recycle time ratio reflecting a current round among the rounds according to the parameter information and the execution information;

calculating an actual delay value reflecting the current round according to the data transfer rate, the recycle time ratio, and a reference delay value; and controlling a data writing speed corresponding to the host system according to the actual delay value, wherein the step of controlling the data writing speed corresponding to the host system according to the actual delay value comprises:

determining whether waiting time has reached the actual delay value after extracting a first write instruction from the host system; and extracting a second write instruction from the host system if the waiting time has reached the actual delay value.

9. The storage device according to claim 8, wherein the step of calculating the data transfer rate and the recycle time ratio reflecting the current round among the rounds according to the parameter information and the execution information comprises:

determining a maximum data transfer quantity among the rounds; and calculating the data transfer rate based on the maximum data transfer quantity and the quantity of the valid data transferred in the current round.

10. The storage device according to claim 9, wherein the step of calculating the data transfer rate based on the maximum data transfer quantity and the quantity of the valid data transferred in the current round comprises:

obtaining the data transfer rate by dividing the quantity of the valid data already transferred in the current round by the maximum data transfer quantity.

11. The storage device according to claim 8, wherein the step of calculating the data transfer rate and the recycle time ratio reflecting the current round among the rounds according to the parameter information and the execution information comprises:

calculating a unit time consumption based on the estimated completion time and the estimated number of executions; and calculating the recycle time ratio based on the time consumed for transferring the valid data in the current round and the unit time consumption.

12. The storage device according to claim 11, wherein the step of calculating the unit time consumption based on the estimated completion time and the estimated number of executions comprises:

obtaining the unit time consumption by dividing the estimated completion time by the estimated number of executions, wherein the step of calculating the recycle time ratio based on the time consumed for transferring the valid data in the current round and the unit time consumption comprises:

obtaining the recycle time ratio by dividing the time consumed for transferring the valid data in the current round by the unit time consumption.

13. The storage device according to claim 8, wherein the step of calculating the actual delay value reflecting the current round according to the data transfer rate, the recycle time ratio, and the reference delay value comprises:

calculating a first value reflecting a moving speed in the current round based on the data transfer rate and the recycle time ratio; and calculating the actual delay value based on the first value and the reference delay value.

14. The storage device according to claim 13, wherein the step of calculating the first value reflecting the moving speed in the current round based on the data transfer rate and the recycle time ratio comprises:

obtaining the first value by dividing the recycle time ratio by the data transfer rate, wherein the step of calculating the actual delay value based on the first value and the reference delay value comprises:

obtaining the actual delay value by multiplying the reference delay value by the first value.

* * * * *